United States Patent [19]

Wickham et al.

[11] 3,733,697
[45] May 22, 1973

[54] METHOD OF MAKING A VACUUM CLEANER HOSE ASSEMBLY

[76] Inventors: William T. Wickham, 930 Brunswick Dr., Waynesville, N.C. 28786; Frank Brown, 5556 Viewpoint Dr., Dayton, Ohio 45459; Donald L. Kleykamp, 868 Heincke Dr., West Carrollton, Ohio 45449; Otto Kossuth, 5936 Deanmont Pl., Dayton, Ohio 45459

[22] Filed: July 28, 1971

[21] Appl. No.: 176,372

Related U.S. Application Data

[62] Division of Ser. No. 848,272, Aug. 7, 1969.

[52] U.S. Cl. .................................... 29/628, 29/629
[51] Int. Cl. .............................................. H01r 43/00
[58] Field of Search ............... 29/629, 628, 630 A; 264/272; 15/377, 321

[56] References Cited

UNITED STATES PATENTS 2,727,299   12/1955   Klumpp, Jr. ..................... 29/629 X
2,769,997   11/1956   Sheahan ............................. 15/377 X
3,275,423    9/1966   Klumpp, Jr. ..................... 29/629 UX
3,387,319    6/1968   Ferraris et al. .................. 15/377 X
3,588,943    6/1971   Hetland .............................. 15/377 X

FOREIGN PATENTS OR APPLICATIONS 1,297,597   11/1962   France ............................... 15/377

Primary Examiner—Charles W. Lanham
Assistant Examiner—James R. Duzan
Attorney—Reuben Wolk

[57] ABSTRACT

A vacuum hose is provided having a plurality of reinforcing wires in the form of electrical conductors which are made as an integral part of the hose and each conductor has electrical components fixed to its opposite ends. A pair of hose connectors is provided at opposite ends of the hose end formed substantially as an integral part thereof to define an assembly with each hose connector having associated electrical components embedded therein and providing the sole support therefor.

5 Claims, 13 Drawing Figures

INVENTORS
WILLIAM T. WICKHAM
FRANK BROWN
DONALD L. KLEYKAMP
OTTO KOSSUTH

BY Reuben Wolk
THEIR ATTORNEY

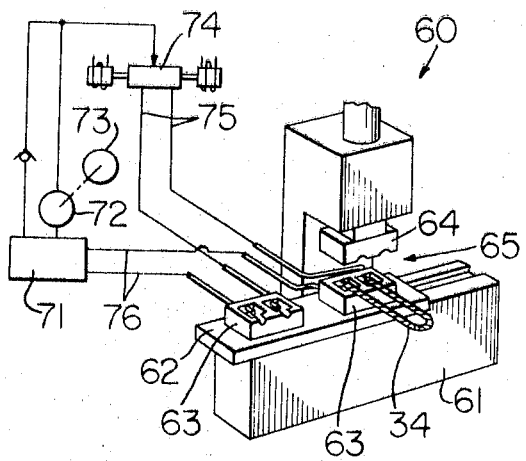

FIG-6

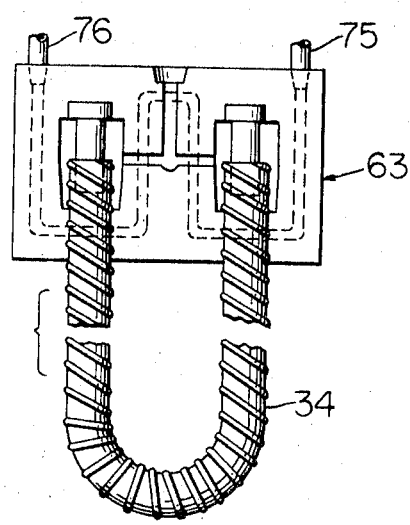

| FIXING ELECTRICAL COMPONENTS TO ELECTRICAL CONDUCTORS CARRIED BY A VACUUM HOSE AND ADJACENT OPPOSITE ENDS OF THE HOSE |
|---|
| ↓ |
| PLACING SAID ENDS IN ASSOCIATED MOLD MEANS |
| ↓ |
| INTRODUCING A THERMOPLASTIC MATERIAL IN THE MOLD MEANS TO FORM INTEGRAL HOSE CONNECTORS AT OPPOSITE ENDS OF THE HOSE WHICH HAVE THE ELECTRICAL COMPONENTS EMBEDDED THEREIN |
| ↓ |
| COOLING THE MOLD MEANS AND INTEGRAL HOSE CONNECTORS |

INVENTORS
WILLIAM T. WICKHAM
FRANK BROWN
DONALD L. KLEYKAMP
OTTO KOSSUTH

BY Reuben Wolk

THEIR ATTORNEY

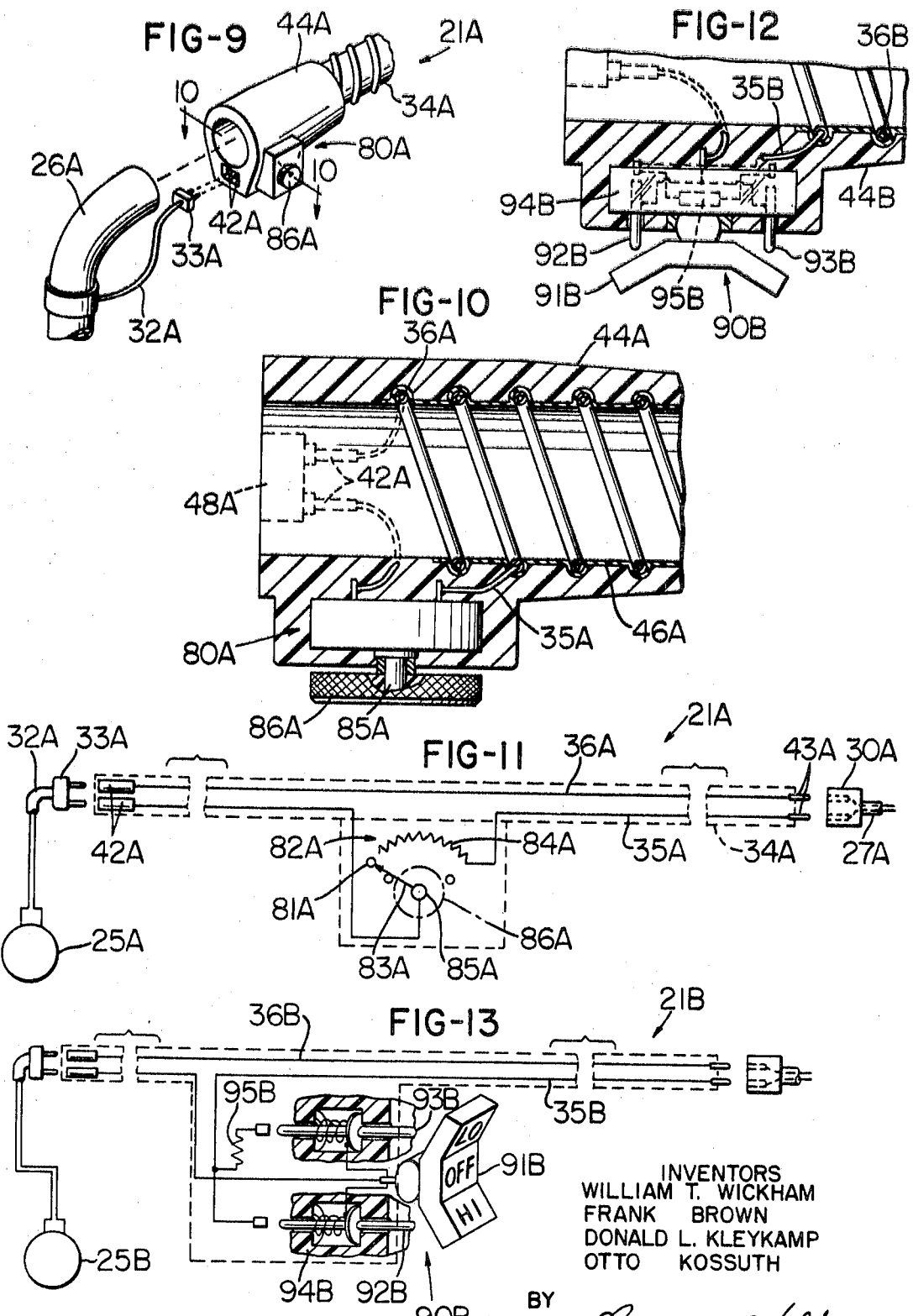

3,733,697

METHOD OF MAKING A VACUUM CLEANER HOSE ASSEMBLY

This application is a division of United States application Ser. No. 848,272, filed Aug. 7, 1969.

BACKGROUND OF THE INVENTION

Many so-called tank or canister type vacuum cleaners in current use have a vacuum hose assembly connected to a tank at one end and cleaning tool at the other end which often comprises a cleaning brush powered by an electric motor. There have been numerous vacuum hose assemblies proposed heretofore for providing electrical power to and controlling such motor; however, these previously proposed assemblies utilize a large number of component parts, are difficult and expensive to assemble and maintain, and are thus generally unsatisfactory.

SUMMARY

This invention provides an improved vacuum cleaner hose assembly, and method of making same, for use with a canister-type vacuum cleaner, or the like, which is of simple and economical construction, has vacuum hose connectors at its opposite ends which are, in essence, provided as an integral part of the vacuum hose comprising such assembly, and has electrical means or devices embedded in each hose connector substantially as an integral part thereof with the hose connectors providing the sole support for the electrical devices. This invention also provides a hose assembly which has integral control means for controlling an electric motor provided on a cleaning tool used in association with such hose assembly wherein the control means is also embedded in one of the hose connectors.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which

FIG. 6 is a perspective view with parts shown schematically and other parts broken away particularly illustrating an exemplary apparatus which may be used to make the hose assembly of this invention;

FIG. 7 is an enlarged plan view of a typical lower mold comprising the apparatus of FIG. 6 and also illustrating the manner of placing a vacuum hose in position therein to form hose connectors as an integral part of its opposite ends;

FIG. 8 is a process chart particularly highlighting certain method steps which may be utilized to form the hose assembly of this invention;

FIG. 9 is a fragmentary perpsective view particularly illustrating another embodiment of a hose assembly having one embodiment of a control switch provided as an integral part of a hose connector at one end of such hose assembly;

FIG. 10 is a fragmentary cross-sectional view with certain parts shown in elevation and taken essentially on the line 10—10 of FIG. 9;

FIG. 11 is an electrical wiring diagram illustrating the manner of electrically connecting the switch of FIGS. 9 and 10 in its electrical circuit;

FIG. 12 is a fragmentary cross-sectional view similar to FIG. 10 and illustrating still another embodiment of a hose assembly having another embodiment of an integral control switch; and FIG. 13 is an electrical wiring diagram similar to FIG. 11 and illustrating the manner of electrically connecting the switch of FIG. 12 in its electrical circuit.

DESCRIPTION OF ILLUSTRATED EMBODIMENTS

Figure 1:
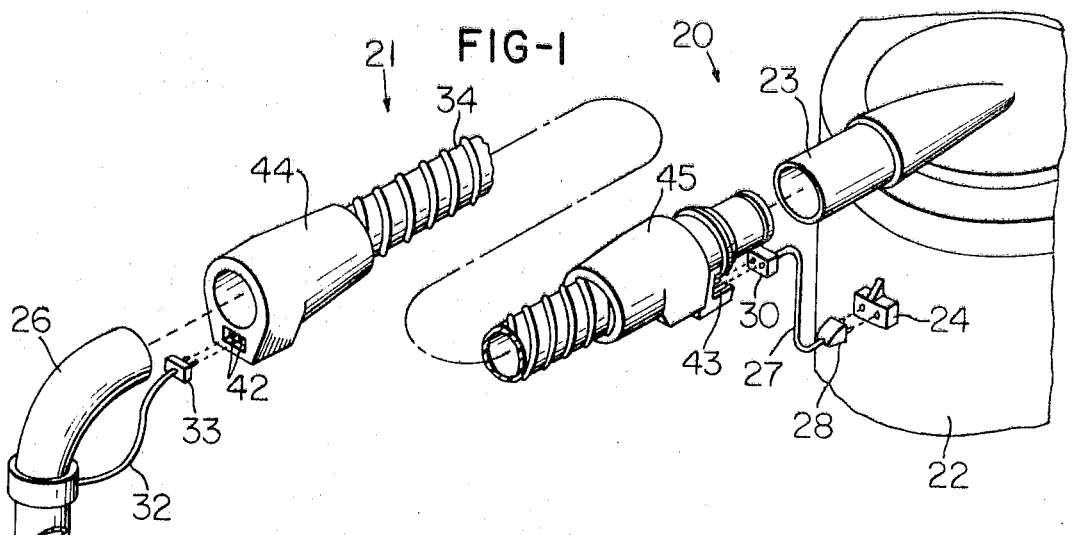
FIG. 1 is a perspective view with parts in cross section and parts broken away illustrating a vacuum cleaning apparatus together with an exemplary vacuum hose assembly of this invention.

Reference is now made to FIG. 1 of the drawings which illustrates an exemplary vacuum cleaning apparatus 20 which utilizes one embodiment of the hose assembly 21 of this invention. The apparatus 20 has a canister or tank 22 provided with a suitable vacuum tube 23 extending outwardly therefrom. The apparatus 20 is provided with electrical power for operating its vacuum unit in a conventional manner and has a female receptacle 24 mounted on its tank 22 and the receptacle 24 is used to supply power through electrical means provided in the hose assembly 21 of this invention to an electric motor 25 comprising the terminal end of a cleaning instrument 26 which is operatively connected to the hose assembly 21.

The apparatus 20 has an electrical cord 27 provided with a male fitting 28 at one end and a female fitting 30 at its opposite end and the cord 27 is used to provide an electrical connection between the female connector 24 and one end of the hose assembly 21. The apparatus 20 also has an electrical cord 32 which has one end electrically connected to the motor 25 in the cleaning instrument 26 and the cord 32 has a male connector 33 which is electrically connected to an associated female connector in the end of the hose assembly 21 which is remote from the tank 22.

The hose assembly 21 is comprised of a flexible vacuum hose 34 which has reinforcing wires 35 and 36 suitably provided substantially as an integral part thereof and in a manner well known in the art and the reinforcing wires also serve as electrical conductors. The wires or conductors 35 and 36 are insulated by tubular jackets or sleeves 40 and 41 respectively of insulating material.

Each wire 35 and 36 has a pair of electrical connector means or devices fixed to its opposite ends and in this example of the invention each wire 35 and 36 has a female connector 42 fixed to one end thereof and a male connector 43 fixed to its opposite end. The male connectors 43 are connected to female fittings 30 of cord 27 and the male connector 33 of cord 32 is plugged in female connectors 42 so that once connector 28 is plugged into receptacle 24 an electrical circuit is completed to the motor 25.

The hose assembly 21 has a pair of hose connectors 44 and 45 fixed to its opposite ends and each hose connector is provided substantially as an integral part of the vacuum hose 34. In particular, each hose connector 44 and 45 is preferably formed in position, as by injection molding, for example, to thereby define a streamlined and compact hose connector in each instance which is fixed to the vacuum hose 34 and has associated electrical connector means embedded therein so as to provide the sole support for such connector means and in a manner to be described in detail subsequently.

Figure 2:
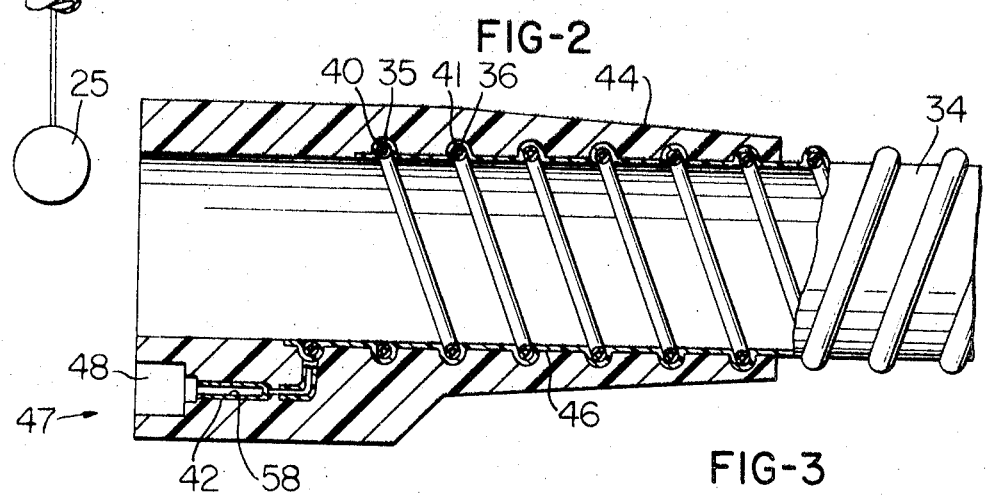
FIG. 2 is a greatly enlarged cross-sectional view particularly illustrating a female hose connector provided at one end of the hose assembly.

As seen in FIG. 2 of the drawings the hose connector 44 is formed in position in a fixed manner around an associated end 46 of the vacuum hose 34 and a pair of female connectors 42 are suitably fixed as by soldering, or the like, to the ends of the conductors 35 and 36 and embedded in position. The female connectors 42 are in a protected position indicated at 47 yet are readily accessible through an access opening 48 provided in the connector 44 during the forming thereof.

The hose connector 45 is also suitably formed in position around the opposite end 50 of the vacuum hose 34 and a pair of male connectors or pins 43 are suitably fixed to the ends of wires 35 and 36. The pins 43 are in a protected position as indicated at 51 and are readily accessible through an access opening 52.

The vacuum hose 34 is preferably made of a plastic material which is also an electrical insulator and the insulating sleeves 40 and 41 provided on the wires 35 and 36 respectively are made of a plastic material which is compatible with the plastic material used to form hose 34 so that the sleeves 40 and 41 and hence wires 35 and 36 may be easily bonded in position essentially as an integral part of the vacuum hose 34. The hose connectors 44 and 45 are preferably made of a thermoplastic material which is easily formed around associated ends of vacuum hose 34 to define connectors 44 and 45 and the thermoplastic material used to make hose connectors 44 and 45 is also an electrical insulating material.

Figure 3:
FIG. 3 is a greatly enlarged fragmentary cross-sectional view illustrating a male hose connector at the opposite end of the hose assembly.

The female members 42 and male pins 43 illustrated in FIGS. 2 and 3 are shown as being soldered in position. However, the hose assembly 21 may be provided with dual-purpose roughly tubular members designated by the reference numeral 53 and illustrated in FIGS. 4 and 5. Each member 53 may be attached to an associated conductor by soldering, or the like; however, member 53 is particularly adapted to be mechanically compressed against an associated wire to provide both a mechanical and an electrical connection and each member 53 may be used as either a male or female connector.

Figure 4:
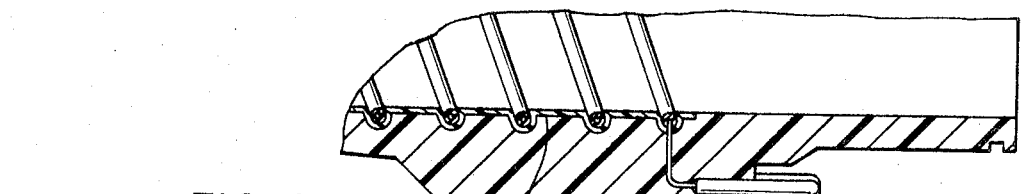
FIG. 4 is a cross-sectional view illustrating a dual-purpose electrical connector which may be optionally used in the hose assembly of FIG. 1 as a female connector.

In particular, it will be seen from FIG. 4 that a reduced diameter cylindrical portion 54 of member 53 is crimped around an associated wire as indicated at 55 to fix the member 53 to such wire so that a larger diameter tubular portion 56 of member 53 will have its tubular inside surface 57 unobstructed so that it may be used as a female receptacle. It will be appreciated that the inside surface 57 corresponds in configuration and size to the inside surface 58 of the female receptacle 42.

Figure 5:
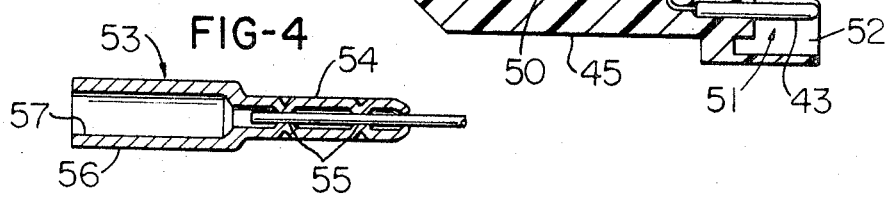
FIG. 5 is a cross-sectional view illustrating the dual-purpose connector of FIG. 4 used as a male connector.

To use the member 53 as a male pin the crimping action is again achieved in a similar manner as illustrated at 55 with the exception that the electrical wire extends through the larger diameter tubular portion 56 and terminates short of the terminal outer end of the reduced diameter portion 54, see FIG. 5. It will be appreciated that the outside surface of reduced diameter portion 54 corresponds in configuration and size to the outside surface of the pin 43.

Thus it is seen that the member 53 may be suitably fixed in position to serve as either a male or female electrical connector depending upon the manner in which the electrical wire is fixed therein. In addition, the added length of each member 53 enables it to be embedded in position in a stronger manner in an associated hose connector.

The hose assembly 21 may be made utilizing any suitably technique; however, it is preferably made utilizing the method steps essentially as presented in FIG. 8 of the drawings and certain ones of such method steps may be carried out using an apparatus of the character presented in FIGS. 6 and 7.

The apparatus illustrated in FIG. 6 comprises an injection molding apparatus 60 which has a base 61 which carries a horizontally supported worktable 62 which may be reciprocated back and forth on the base. The worktable 62 carries mold means shown in this example as a pair of lower molds 63 of substantially identical construction and each mold 63 is adapted to receive opposite ends of a vacuum hose 34 therewithin as seen in FIG. 7.

The apparatus 60 has an upper mold 64 which is adapted to be placed in position over each lower mold 63 in an alternating manner and with the upper mold 64 positioned over a mold 63 the molds cooperate to define a mold assembly 65 and a pair of mold cavities around opposite ends of the vacuum hose and such cavities define the configurations of hose connectors 44 and 45. A suitable plastic material such as a thermoplastic material is then injected under heat and pressure into such mold cavities and suitably cooled to define the hose connectors 44 and 45 substantially as an integral part of the vacuum hose 34.

The apparatus 60 also has a cooling system indicated at 70 which includes a cooling unit 71 which contains a cooling fluid which is circulated by a pump 72 driven by a motor 73. A selector valve 74 is provided which has a line 75 connected to one end of each of the lower molds 63 and a return line 76 is provided from the opposite end of each lower mold 63 to the unit 71. During the time that a thermoplastic material is injected into a particular mold assembly 65 to define integral hose connectors 44 and 45 the selector valve is positioned so that coolant will not flow through the lower mold cavity of such assembly. However, once the injection molding has been completed the mold remains closed and cooling fluid is circulated through the particular assembly 65 for approximately one minute to chill the thermoplastic material. The upper mold 64 is then moved away and the worktable 62 is moved so as to position the other lower mold 63 with its vacuum hose 34 in position beneath the upper mold 64 so that upon moving the upper mold 64 in position the injection molding procedure may be repeated to form another hose assembly 21.

The worktable 62 is easily shuttled on the base 61 so that during the time that hose connectors 44 and 45 are being simultaneously injection molded and chilled at opposite ends of one vacuum hose 34 loaded in one lower mold 63 another vacuum hose 34 is being placed or loaded and suitably supported in position on the other lower mold 63 whereby the apparatus 60 enables efficient forming of hose assemblies 21.

The thermoplastic material is injected into each mold assembly 65 in a known manner and excellent results have been obtained by heating vinyl materials, such as polyvinyl chloride for example, to a temperature ranging roughly between 380° and 410° Fahrenheit. In addition, satisfactory results have been obtained by injecting the thermoplastic material into the mold cavity at pressures of roughly 550 psig.

Each lower mold 63 and the upper mold 64 are constructed to enable both ends of a vacuum hose 34 to be suitably supported in position. Once the thermoplastic material is introduced into the assembly 65 defined by molds 63 and 64 the hose connectors 44 and 45 are formed simultaneously whereby the vacuum cleaner assembly 21 is essentially a one-piece construction, even though comprised of a number of parts, and such one piece construction cannot be taken apart except by practically destroying it. Obviously, this makes an assembly which has a long operating life, is safe to use, and is essentially tamper-proof.

Another exemplary embodiment of a vacuum hose assembly of this invention is illustrated in FIGS. 9, 10, and 11 of the drawings. The hose assembly of FIGS. 9-11 is very similar to the hose assembly 21; therefore, such hose assembly will be designated by the reference numeral 21A and parts of the hose assembly 21A which are very similar to corresponding parts of the hose assembly 21 will be designated by the same reference numeral as in the hose assembly 21, also followed by the letter designation "A" and not described again. Only those component parts which are substantially different from corresponding parts of the hose assembly 21 will be designated by a new reference numeral also followed by the letter designation "A" and described in detail.

The hose assembly 21A differs from the hose assembly 21 only in that it has an electrical control device 80A embedded in its hose connector 44A. The electrical control device 80A is in the form of control switch which is electrically connected in series in the line 35A and has an "off" position 81A and integral means shown as a potentiometer 82A capable of providing a substantially infinite number of electrical outputs therefrom for controlling a motor 25A comprising an associated cleaning tool assembly 26A.

The potentiometer has a rotatably arm 83A which is electrically connected to one end portion of the conductor 35A and a variable resistor 84A which is connected to the opposite end portion of the conductor 35A whereupon by moving the arm 83A from the "off" position and into contact with the variable resistor 84A the resistance in the system may be varied in a known manner to provide substantially infinite speed control for the motor 25A. As best seen in FIG. 10, the switch 80A has a shaft 85A extending outwardly therefrom and the shaft is operatively connected to the arm 83A at its inner end and has knurled knob 86A attached thereto at its outer end to thereby enable an operator to easily adjust the device 80A. The hose connector 44A is formed as an integral part of the vacuum hose 34A as previously explained and with the switch being integrally embedded in connector 44A it provides the sole support as well as electrical insulation and protection for such switch.

Another exemplary embodiment of this invention is illustrated in FIGS. 12 and 13 of the drawings. The hose assembly illustrated in FIGS. 12 and 13 is very similar to the hose assembly 21; therefore, such hose assembly will be designated generally by the reference numeral 21B and parts thereof which are very similar to corresponding parts of the hose assembly 21 will be designated by the same reference numeral as in the hose assembly 21 also followed by the letter designation "B" and not described again in detail. As previously, only substantially different component parts will be given new reference numerals also followed by the letter designation "B" and described in detail.

The hose assembly 21B utilizes an electrical switch 90B which is suitably embedded and formed essentially as an integral part of hose connector 44B whereby the hose connector 44B provides the sole support for switch 90B as well as electrical insulation and protection therefor. The switch 90B has an actuating lever 91B which is normally in an "off" position and by actuating the lever 91B the switch may be moved in contact with either a spring-loaded pin 92B or a spring-loaded pin 93B suitably supported in an associated housing 94B.

Upon actuating the lever 91B so that it urges pin 93B inwardly an electrical connection is provided through an integral resistor 95B and thereby provides a reduced current flow to operate the associated motor 25B at low speed. Upon actuating the lever 91B so that it urges the pin 92B inwardly an electrical connection is provided which bypasses the resistor 95B whereupon the motor 25B is operated at high speed. The button or lever 91B is in the form of a toggle arrangement of known construction and once actuated to operate the motor 25B at either low or high speed by depressing pin 93B or 92B respectively the particular pin remains depressed until the lever is again actuated to either move it to the "off" position or into contact with the other pin.

In this example of the invention the switches 80A and 90B are shown as being embedded in associated integral connectors 44A and 44B respectively and such connectors define the end of their hose assembly which is arranged opposite the associated tank or canister. However, it will be appreciated that, if desired, switches 80A and 90B may be provided in the ends of their hose assembly arranged adjacent their canister and hence in ends 45A and 45B respectively.

Any suitable plastic material may be used to form the hose connectors comprising opposite ends of each hose assembly of this invention; however, it is preferable that a thermoplastic material such as polyvinyl chloride, polyethylene, and the like, be utilized and injected molded in position to simultaneously form and fix the hose connectors in position at the opposite ends of an associated vacuum hose as well as embed the associated electrical devices whether they be male or female connectors or electrical switches whereby each hose assembly of this invention is formed in a simple, efficient, and low-cost manner.

The thermoplastic material which is selected to make the integral hose connectors should also be compatible with the flexible plastic material which is used to define the vacuum hose to assure that the hose connectors are formed at opposite ends of the vacuum hose essentially as an integral part thereof and such thermoplastic material serves as a matrix within which associated electrical components are embedded in a high strength and electrically insulated manner.

The apparatus 60 and method of this ivention have been described primarily in connection with the hose assembly 21. However, it is to be understood that the molds of such apparatus may be suitable modified in a manner well known in the art to enable forming of hose assemblies 21A and 21B in a similar manner as assembly 21. In addition, the method of forming hose assemblies 21A and 21B is substantially identical to the method of forming hose assembly 21.

While present exemplary embodiments of this invention and methods of practicing the same have been illustrated and described, it will be recognized that this invention may be otherwise variously embodied and practiced by those skilled in the art.

What is claimed is:

1. A method of making a unitary vacuum cleaner hose assembly having a plurality of axially spaced electrically conducting reinforcing coils with axially alternating turns terminating in outwardly extending ends; comprising the steps of affixing electrical means to at least one end of said coils, placing and supporting said end within a mold cavity, introducing a thermoplastic material into said cavity under heat and pressure, and forming an integral hose connector on said end to embed and support said end and means.

2. The method of claim 1 including the steps of affixing a male electrical connector means to one end of said coils, affixing a female electrical connector means to the other end of said coils, and embedding said means within their respective hose connectors.

3. The method of claim 1 including the steps of affixing an electrical control device to one end of said coils, and embedding said device within said connector.

4. The method of claim 3 in which said device is an electrical control switch.

5. The method of claim 1 including the steps of affixing electrical means to both ends of said coils, placing and supporting both ends of said coils and corresponding means within adjacent mold cavities, and simultaneously forming integral hose connectors on said ends to embed and support said ends and corresponding means.

* * * * *

PO-1050
(5/69)

UNITED STATES PATENT OFFICE
CERTIFICATE OF CORRECTION

Patent No. 3,733,697  Dated May 22, 1973

Inventor(s) William T. Wickham, Frank Brown, Donald L. Kleykamp, Otto Kossuth

It is certified that error appears in the above-identified patent and that said Letters Patent are hereby corrected as shown below:

On the title page between "[76]" and "[22]" insert the following:

--- [73] Assignee: Dayco Corporation, Dayton, Ohio ---

Signed and sealed this 12th day of February 1974.

(SEAL)
Attest:

EDWARD M. FLETCHER, JR.
Attesting Officer

C. MARSHALL DANN
Commissioner of Patents